3,026,335
17-ESTERS OF 16α,17α-DIHYDROXY-
PROGESTERONE
Josef Fried, Princeton, N.J., assignor to Olin Mathieson
Chemical Corporation, New York, N.Y., a corporation of Delaware
No Drawing. Filed Jan. 20, 1959, Ser. No. 787,805
4 Claims. (Cl. 260—397.4)

This invention relates to the synthesis of new steroids and has for its object the provision of new esters of 16α, 17α-dihydroxyprogesterone.

The compounds of this invention can be represented by the following general formula

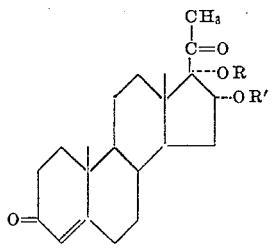

wherein R is the acyl radical of a hydrocarbon carboxylic acid of less than thirteen carbon atoms, and R' is hydrogen or the acyl radical of a hydrocarbon carboxylic acid of less than thirteen carbon atoms.

The compounds of this invention, unlike unesterified 16α,17α-dihydroxyprogesterone, are physiologically active substances which possess progestational activity when administered either parenterally or perorally. Thus, the compounds of this invention can be employed instead of progesterone, for example, in the treatment of functional uterine bleeding and amenorrhea. The dosage for such administration is of course dependent on the relative activity of the particular ester.

The compounds of this invention are prepared by interacting 16α,17α-dihydroxyprogesterone with an acylating agent, the reaction preferably being conducted in the presence of a strongly acidic esterification catalyst such as p-toluenesulfonic acid or perchloric acid. Among the suitable acylating agents can be mentioned the acid anhydrides and acyl halides (particularly chlorides) of alkanoic acids (e.g. acetic, propionic, butyric, hexanoic, octanoic, and dodecanoic acid), aromatic carboxylic acids (e.g. benzoic, naphthoic, and toluic acid), aralkanoic acids (e.g. α-toluic, β-phenylpropionic, and α-phenylbutyric acid), cycloalkane carboxylic acids (e.g. hexahydrobenzozic acid), alkenoic acids, and cycloalkene carboxylic acids.

The reaction results in the preparation of the 16,17-diesters of 16α,17α-dihydroxyprogesterone, wherein both ester groups are the same. To prepare mixed diesters or 17-monoester derivatives, the diester can be partially saponified by treatment with dilute basic reagent, such as dilute alkali hydroxide or dilute alkali carbonate in a lower alcohol. If a mixed diester is desired, the resulting 17-monoester can be esterified by treatment with an acylating agent such as the acid anhydride or acyl halide (particularly chloride) of one of the acids named hereinbefore, thereby esterifying the free hydroxyl group in the 16-position. The reaction is preferably conducted in the presence of a tertiary base (e.g. pyridine).

The following examples are illustrative of the invention (all temperatures being in centigrade):

EXAMPLE 1

*16α,17α-Dihydroxyprogesterone 16,17α-Dicaproate*

A mixture of 300 mg. of 16α,17α-dihydroxyprogesterone, 16 mg. of p-toluenesulfonic acid monohydrate, 0.97 ml. of hexanoic anhydride and 10 ml. of dry benzene is heated at 80° in a Wood's metal bath until a clear solution is obtained. The mixture is allowed to remain at room temperature for 22 hours after which time ice is added and the excess anhydride is decomposed by stirring for 2 hours at room temperature. The mixture is taken up in chloroform, extracted with water and dilute bicarbonate and again with water. The chloroform solution is then dried over sodium sulfate and the solvent removed in vacuo. The residue is taken up in 10 ml. of hexane and chromatographed on 15 grams of acid-washed alumina. After washing the column with 400 ml. of hexane the dicaproate is eluted with 1 l. of benzene-hexane 1:1 and 600 ml. of benzene. Evaporation of the solvents leaves a colorless oil which failed to crystallize. It showed a single spot on paper chromatography in the methylcyclohexanecarbitol system;

$\lambda_{max.}^{Nujol}$ 5.76, 6.01 and 6.20μ

EXAMPLE 2

*16α,17α-Dihydroxyprogesterone 17α-Monocaproate*

A solution of 500 mg. of 16,17α-dihydroxyprogesterone dicaproate in 20 ml. of 3% potassium hydroxide in methanol is allowed to remain at room temperature for 18 hours. The mixture is then diluted with water, neutralized with dilute acetic acid and the bulk of the methanol removed in vacuo. The steroid is extracted with chloroform, the chloroform extract washed with water, dried over sodium sulfate and concentrated in vacuo. The residue constitutes the 17α-monocaproate of 16α,17α-dihydroxyprogesterone.

EXAMPLE 3

*16α,17α-Dihydroxyprogesterone 16α-Acetate
17α-Caproate*

A solution of 500 mg. of 16α,17α-dihydroxyprogesterone 17α-caproate in 5 ml. of anhydrous pyridine and 2 ml. of acetic anhydride is allowed to stand at room temperature for 18 hours. At the end of this period the reagents are evaporated in vacuo. The residue constitutes the 16α-acetate 17α-caproate of 16α,17α-dihydroxyprogesterone.

EXAMPLE 4

*16α,17α-Dihydroxyprogresterone 16α,17α-Diacetate*

Following the procedure of Example 1, but substituting 1 ml. of acetic anhydride for the hexanoic anhydride, there is obtained 16α,17α-dihydroxyprogesterone 16α,17α-diacetate.

EXAMPLE 5

*16α,17α-Dihydroxyprogesterone 17α-Monoacetate*

Following the procedure of Example 2, but substituting 500 mg. of 16α,17α-dihydroxyprogesterone 16α,17α-diacetate for the 16α,17α-dihydroxyprogesterone 16α,17α-dicaproate, there is obtained 16α,17α-dihydroxyprogesterone 17α-monoacetate.

EXAMPLE 6

*16α,17α-Dihydroxyprogesterone 16α-Benzoate
17α-Acetate*

Following the procedure of Example 3, but substituting 500 mg. of 16α,17α-dihydroxyprogesterone 17α-monoacetate for the 16α,17α-dihydroxyprogesterone 17α-monocaproate and 0.5 ml. of benzoyl chloride for other acetic anhydride, there is obtained 16α,17α-dihydroxyprogesterone 16α-benzoate 17α-acetate.

Similarly, by substituting any other acid anhydride or acyl halide of a hydrocarbon carboxylic acid of less than thirteen carbon atoms for the hexanoic anhydride of Example 1, the corresponding 16α,17α-diester derivative is obtained. These diesters can then be partially hydrolized to yield the corresponding 17α-monoester by the method of Example 2 and then treated with an acid anhydride or acyl halide of a dissimilar hydrocarbon carboxylic acid of less than thirteen carbon atoms to yield a mixed 16α,17α-diester derivative.

The invention may be variously otherwise embodied within the scope of the appended claims.

What is claimed is:

1. The process of preparing a diester of 16α,17α-dihydroxyprogesterone which comprises interacting 16α,17α-dihydroxyprogesterone with an acylating compound selected from the group consisting of the acid anhydrides and acyl halides of hydrocarbon carboxylic acids of less than thirteen carbon atoms in the presence of a strongly acidic esterification catalyst and recovering the 16,17-diester formed.

2. The process of claim 1 wherein the acylating compound is alkanoic anhydride.

3. The process of claim 1 wherein the acylating compound is hexanoic anhydride.

4. A process for preparing a 16α,17α-dihydroxyprogesterone 17α-monoester, which comprises interacting the corresponding 16α,17α-dihydroxyprogesterone 16α,17α-diester with a dilute basic reagent.

References Cited in the file of this patent
UNITED STATES PATENTS

| | | |
|---|---|---|
| 2,727,909 | Colton | Dec. 20, 1955 |
| 2,753,360 | Kaspar et al. | July 3, 1956 |
| 2,814,631 | Gould | Nov. 26, 1957 |

OTHER REFERENCES

Cooley et al.: J. Chem. Soc. (London), December 1955, pp. 4373–4377 (pp. 4374 and 4375 necessary).